(12) United States Patent
Zuteck

(10) Patent No.: US 9,394,880 B2
(45) Date of Patent: Jul. 19, 2016

(54) TALL WIND TURBINE TOWER ERECTION WITH CLIMBING CRANE

(71) Applicant: Michael Zuteck, Clear Lake Shores, TX (US)

(72) Inventor: Michael Zuteck, Clear Lake Shores, TX (US)

(*) Notice: Subject to any disclaimer, the term of this patent is extended or adjusted under 35 U.S.C. 154(b) by 0 days.

(21) Appl. No.: 14/724,040

(22) Filed: May 28, 2015

(65) Prior Publication Data

US 2016/0010621 A1 Jan. 14, 2016

Related U.S. Application Data

(63) Continuation of application No. 14/580,471, filed on Dec. 23, 2014.

(60) Provisional application No. 62/023,744, filed on Jul. 11, 2014.

(51) Int. Cl.
| | |
|---|---|
| *B66C 23/00* | (2006.01) |
| *E04H 12/00* | (2006.01) |
| *F03D 1/00* | (2006.01) |
| *B66C 23/18* | (2006.01) |
| *E04H 12/34* | (2006.01) |
| *F03D 11/04* | (2006.01) |

(52) U.S. Cl.
CPC .............. *F03D 1/001* (2013.01); *B66C 23/185* (2013.01); *E04H 12/00* (2013.01); *E04H 12/342* (2013.01); *E04H 12/345* (2013.01); *F03D 11/04* (2013.01); *F05B 2230/50* (2013.01); *F05B 2230/61* (2013.01); *F05B 2240/91521* (2013.01)

(58) Field of Classification Search
CPC .... B66C 23/16; B66C 23/185; B66C 23/203; B66C 23/207; B66C 23/208; B66C 23/005; B66C 23/28; Y02E 10/728; F03D 1/001

See application file for complete search history.

(56) References Cited

U.S. PATENT DOCUMENTS 2,135,631 A * 11/1938 Amesbury .............. E01D 19/14
                                                14/22
4,156,580 A     5/1979  Pohl
4,499,034 A     2/1985  McAllister
(Continued)

FOREIGN PATENT DOCUMENTS

WO   WO 2011028641 A1 *  3/2011
WO   WO 2016007241 A1 *  1/2016

OTHER PUBLICATIONS

International Preliminary Report on Patentability for PCT/US2010/046979 dated Mar. 6, 2012 (10 pages).*

(Continued)

*Primary Examiner* — Christine T Cajilig
(74) *Attorney, Agent, or Firm* — David McEwing

(57) ABSTRACT

A wind turbine tower comprising a forward leaning rotating tower where the tower rotates on lower and upper bearings. The upper bearing is held in position by a second fixed lower tower that encloses a lower portion of the first rotating tower. A method of constructing a wind turbine tower comprising building a tower in segments; including elements of the tower segments enabling the attachment, support, and movement of a climbing crane. Also included is a lifting cable communicating with a ground based winch vehicle. Climbing crane is positioned on the tower to enable the climbing crane to reach forward of the tower and to raise segments of the tower to build it to full height, and to also raise the nacelle and rotor of the wind turbine.

5 Claims, 3 Drawing Sheets

(56) References Cited

U.S. PATENT DOCUMENTS

| | | | | |
|---|---|---|---|---|
| 4,856,662 | A | * | 8/1989 | Marvin ................. B66C 23/283 212/175 |
| 4,979,871 | A | | 12/1990 | Reiner |
| 5,151,610 | A | | 9/1992 | St. Germain |
| 5,213,470 | A | * | 5/1993 | Lundquist ............ F03D 1/0658 416/137 |
| 6,157,088 | A | | 12/2000 | Bendix |
| 6,522,025 | B2 | * | 2/2003 | Willis ..................... E02D 27/42 290/55 |
| 6,955,025 | B2 | | 10/2005 | Dehlsen |
| 7,891,939 | B1 | * | 2/2011 | Zuteck ...................... F03D 1/04 415/4.3 |
| 8,061,964 | B2 | * | 11/2011 | Zuteck ..................... F03D 7/0204 415/4.3 |
| 8,069,634 | B2 | * | 12/2011 | Livingston .............. F03D 1/001 52/120 |
| 2002/0069596 | A1 | | 6/2002 | Ritz |
| 2003/0183594 | A1 | * | 10/2003 | Torres Martinez ... B66C 23/207 212/196 |
| 2004/0190999 | A1 | | 9/2004 | Wybro |
| 2007/0108776 | A1 | | 5/2007 | Siegfriedsen |
| 2007/0151194 | A1 | * | 7/2007 | Livingston .............. B66C 23/06 52/651.05 |
| 2008/0084068 | A1 | | 4/2008 | Shibata |
| 2009/0028647 | A1 | | 1/2009 | Bingham |
| 2009/0120830 | A1 | | 5/2009 | Livingston |
| 2009/0126313 | A1 | | 5/2009 | Jolly |
| 2009/0211173 | A1 | | 8/2009 | Willey |
| 2010/0101086 | A1 | * | 4/2010 | Amram ................. B66C 23/207 29/889.1 |
| 2010/0301613 | A1 | | 12/2010 | Oosterling |
| 2011/0058944 | A1 | * | 3/2011 | Zuteck .................. F03D 7/0204 416/1 |
| 2011/0058956 | A1 | | 3/2011 | Zuteck |
| 2012/0328442 | A1 | * | 12/2012 | Davis ...................... F03D 1/001 416/204 R |
| 2014/0102039 | A1 | * | 4/2014 | Wagner ................... F03D 1/001 52/745.18 |
| 2015/0167342 | A1 | * | 6/2015 | Montaner Fraguet .. B66C 23/32 52/745.18 |

OTHER PUBLICATIONS

Written Opinion for PCT/US2015/033831 mailed Oct. 23, 2015 (5 pages).*

* cited by examiner

TALL WIND TURBINE TOWER ERECTION WITH CLIMBING CRANE

RELATED APPLICATIONS

This application is a CONTINUATION APPLICATION of application Ser. No. 14/580,471 filed Dec. 23, 2014 and entitled "Tall Wind Turbine Tower Erection with Climbing Crane". This application also claims the benefit of and priority to the provisional application Ser. No. 62/023,744 entitled Modular Wing-Shaped Tower Self-Erection for Increased Wind Turbine Hub Height filed Jul. 11, 2014. This provisional application 62/023,744 in incorporated by reference herein in its entirety.

BACKGROUND OF DISCLOSURE

1. Field of Use

This disclosure pertains to power generating wind turbines utilizing a rotating tower with increased dimensions in the direction of the wind, compared to across the wind. The tower may be modular to facilitate transportation and construction. It may also utilize a fixed lower tower to retain at its top a rotating bearing that supports rotation of the rotating tower located within and extending above the fixed lower tower. The disclosed climbing crane and construction method may also be used with non-rotating tall towers.

2. Prior Art

Designs for power generating wind turbines are known in the art. Most require the construction of a stationary cantilever tower, frequently conical in design, that must withstand wind loadings from all directions. Other towers comprise multi-leg structures. The rotor and nacelle usually yaw on top of the fixed tower. A limited class of towers that rotate are known in the early art.

BACKGROUND TO DISCLOSURE

The tower design subject of this disclosure seeks to increase annual energy production (AEP) by reaching up to generally increased wind speed with height in the atmospheric boundary layer region near the earth's surface. Proximate to the earth's surface, friction, along with thermal and turbulent mixing effects, cause rapid changes in wind speed. These effects decrease with increased height.

Wind speed is often assumed to scale vertically using a power law with a wind shear parameter of $\alpha=1/7$ at onshore sites. This simplified calculation yields about a 10% increase in wind speed going from a typical 80 m to a 150 m increased hub height. Given the cubic relationship between wind speed and energy in the wind flow, this 10% speed increase adds about ⅓ more wind turbine output below rated power, and allows the turbine to reach its full rating in 10% less wind. The effect is to produce more energy overall, and to spread the energy more evenly over time, both of which have economic value to the wind generating facility.

In the early years of commercial wind turbine development, tower heights were low by today's standards, and relatively small rotors were used for a given turbine rating, resulting in rotor disk loadings often in the range of 400-500 watts/meter^2, and capacity factors (the average of rated power achieved) in the 20%-30% range. The taller towers and larger rotors used now result in disk loadings in the 200-300 watts/m^2 range, and capacity factors often over 40%.

High capacity factors make better use of the transmission lines, and the wind facility is online more of the time, making it a more statistically reliable source from the utility perspective.

The introduction of even taller towers would further enhance this long term trend, by reaching the stronger, steadier, more reliable winds further above the ground. Particularly at lower speed wind sites, the amount of additional energy revenue can be large, often a ⅓ to even ⅔ increase depending on specific site conditions.

The key difficulty in exploiting favorable winds higher aloft is that conventional tower weight and cost scale up rapidly with increasing height, and the increase in tower cost can offset the additional revenue. The wing-shaped rotating tower subject of U.S. Pat. Nos. 7,891,939 B1 & 8,061,964 B2 which are incorporated by reference in their entirety, reduces the cost burden of additional height. This is achieved through the tower rotation that aligns its primary strength with the thrust plane, thereby consuming less material by providing increased dimensions in that plane, while also reducing the need to carry loads from other directions.

Another difficulty with exceptionally tall towers of 150 m or more, is that there are few cranes large enough to lift the turbine and rotor onto such a tower, they are very expensive, and are so large they cannot reach all desirable wind sites. To reduce this aspect of the tall tower cost, the rotating wing tower itself becomes the crane during erection, via a climbing crane assembly that uses the partially completed rotating tower to build itself to full height, then lift the turbine nacelle and rotor to the top once completed. This addresses a major cost element without which tall towers are less likely to achieve widespread market significance.

The goal of this patent is allow cost effective construction of wind turbine towers to up to and beyond 150 m (500 ft), while also mitigating logistic, transportation, and installation constraints. The described invention is based on a patented, lightweight, rotating, wing-shaped tall tower, that may be supported by a fixed lower tower. The invention discloses a climbing crane with balanced boom that allows the partially completed rotating tower to be the crane structure used in its own completion, and for lifting the wind turbine nacelle and rotor to the top once the tower is complete. The method for using the climbing crane to erect the tower is also disclosed. Certain aspects of this disclosure are applicable to non-rotating tall towers as well.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF DISCLOSURE

It will be appreciated that not all embodiments of the invention can be disclosed within the scope of this document and that additional embodiments of the invention will become apparent to persons skilled in the technology after reading this disclosure. These additional embodiments are claimed within the scope of this invention.

Figure 7:
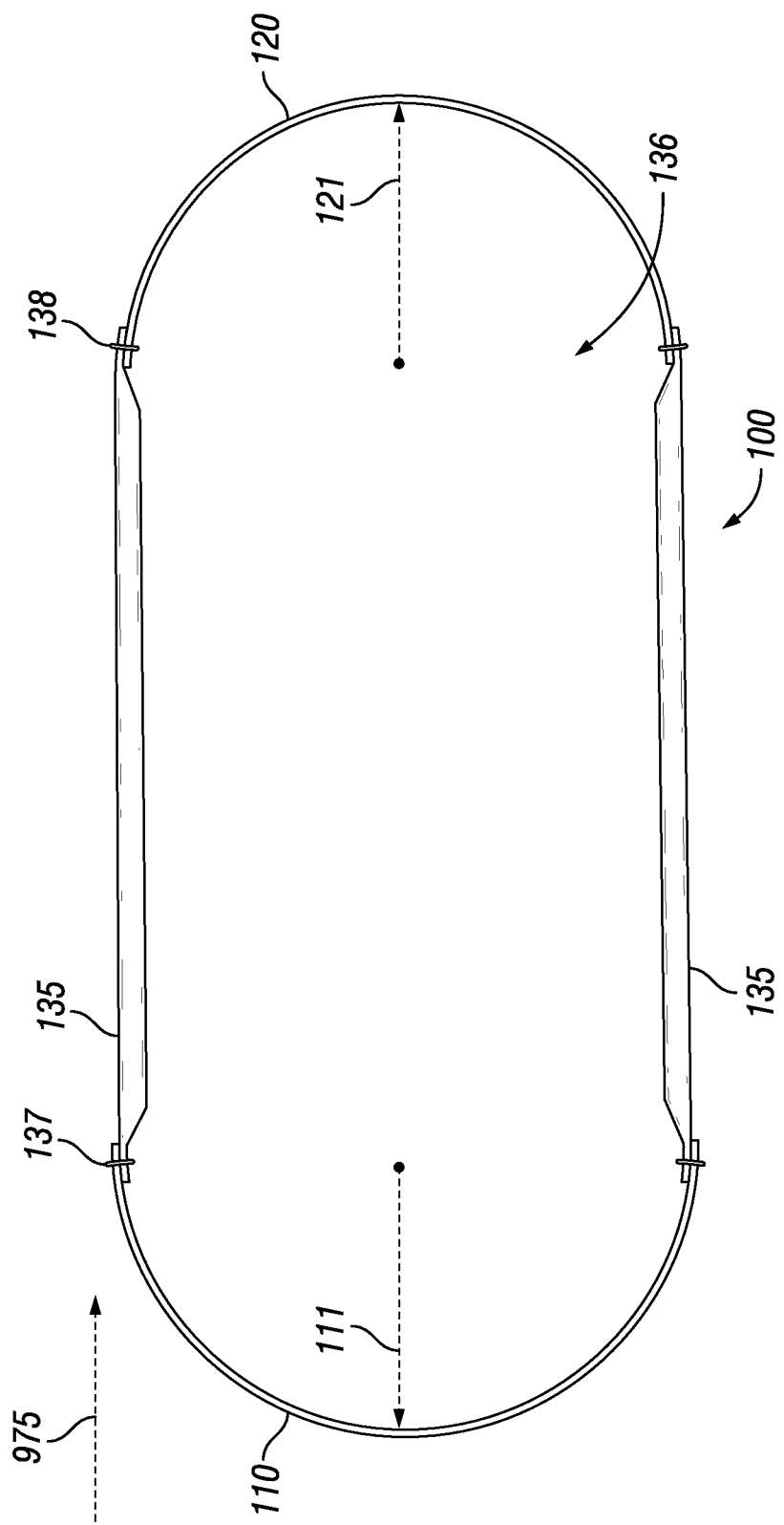
FIG. 7 is a cross sectional view of the rotating tower section illustrating the leading (front) edge and the trailing (back) edge.

Referencing FIG. 7, the rotating wing-shaped tower 100 can be oriented with the wind (shown by vector arrow 975), which allows less material to carry a given bending moment, and reduced aerodynamic drag, compared with a conventional round tower, which must accept turbine and direct wind loading from any direction. The wing portion is comprised of structural leading 110 and trailing 120 edges that provide the main load paths, with joining panels 135 between the edges. The joining panels can be mechanically fastened 137, 138 to the leading edge 110 and trailing edge 120. The interior of the wing-shaped tower 136 can be empty. The separation of the edges tapers to follow the thrust bending moment on the tower. The half circle leading and trailing edges are further apart than for a circular shape, and strength in the fore-aft direction is increased, about linearly with centroid separation, while stiffness increases even faster, going nearer as the square. This basic improvement in section geometry is what allows a given amount of material to reach higher into the airflow than is possible with conventional round tower construction. The leading and trailing edges need not be circles, and will be tailored for aerodynamic and structural optimization—the basic mechanism of increased efficiency remains effective.

As will be described in greater detail herein, the tower can be modified to contain components allowing the attachment and movement of a climbing crane. The disclosed tower and crane could be used with either a windward facing or downwind facing wind turbine, so it is appropriate to define the tower edges relative to crane function. As used herein, front refers to the tower side facing the components to be lifted, while back refers to the side facing away from the components to be lifted. It will be further appreciated that the back edge above the upper bearing is at a less vertical angle than the front edge thereby facilitating the operation of the climbing crane.

The tapering shape of the tower structure follows the primary thrust moment distribution, reducing the need to taper material thickness, and efficiently transferring load to the foundation via the conical tower base (fixed lower tower). The tapering tower width allows relatively uniform stress in the main structural edges so their material is loaded efficiently, and the side panels need carry only modest amounts of shear and bending loads. The material properties and shape can be selected based upon the rotating tower maintaining a relatively constant orientation with the wind.

Only the conical fixed lower tower, typically steel or reinforced concrete, need take loads from all directions down into the foundation. A large bearing at the top of the fixed lower tower primarily transfers horizontal forces and weight between the tower sections, not the entire local bending moment, providing a natural place to advantageously change tower material and structural type to save upper tower weight and cost. In another embodiment, cables could fix the position of the upper bearing, as disclosed in the US patents cited herein.

In extreme wind conditions the tower may be allowed to self-feather causing the leading edge to become the trailing edge. The ability to choose the thickness, shape, and local radius of curvature of the front edge part enhances the buckling stability of the front edge while minimizing its weight and cost, i.e., maximizes structural efficiency. The ability to tailor the shape of this edge could have a substantial impact on its weight, as its buckling stability may be a design driver for passive high wind self-feathering survivability.

All components may be modular and shipped within existing wind turbine trucking and lifting constraints. The fixed portion can be installed with a conventional crane and can support tilting up a wing portion. The forward-leaning top of the wing tower can then be used to hoist upper tower sections to efficiently achieve very tall tower heights, and to provide the nacelle and rotor lift after the tower is assembled to full height. The description of the construction process is described below with reference to the FIGS. 1 through 6.

Figure 1:
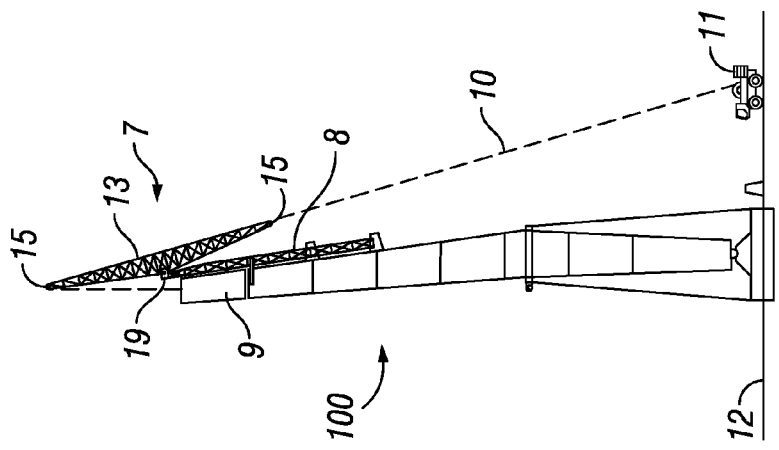
FIG. 1 illustrates a side view of a fixed lower tower and the tilting up of a portion of the forward leaning rotating tower into position on a lower bearing and a upper bearing.

FIG. 1 illustrates an exposed interior side view of the fixed lower tower 50. Also illustrated are the front edge 110 and the back edge 120 of the rotating tower. The rotating tower is shown installed on the lower bearing 370, and being tilted up from its mid point 330 (mid-tower collar), through a temporary slot (not illustrated) in the fixed lower tower. The mid point is where the separation between the front and back edge is the greatest, and the tower is strongest. The height of the fixed tower is shown by vector arrow 15. The height of the midpoint may be the same as the height of the fixed lower tower wherein the bearing loads are taken into the strongest place on the tower. Also shown is the ground based winch vehicle 11, that may tilt up the rotating tower, although this may also be done with a crane used to build the lower tower, or to position loads for later lifts by the self-erecting tower climbing crane.

Figure 2:
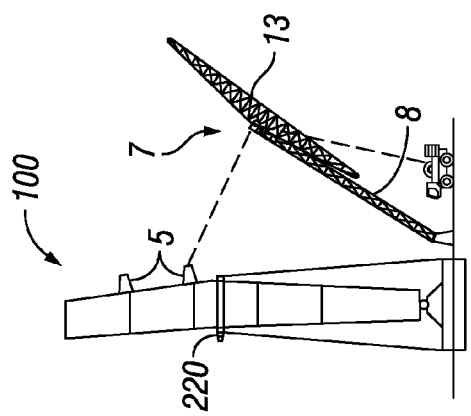
FIG. 2 illustrates a side view of the rotating tower positioned on the lower bearing and upper bearing, and tilting up the climbing crane toward its initial position on the tower back edge.

FIG. 2 illustrates the completed installation of the rotating tower 100 on to the lower bearing and the upper bearing 220. The function and operation of the lower bearing and upper bearing in relation to the rotating tower is more fully described in U.S. Pat. Nos. 7,891,939 & 8,061,964. FIG. 2 also shows the climbing crane 7 being tilted toward initial engagement with the tower, from which position it would be moved to working height to begin its climb. The attachment modules 5 may be in position on the rotating tower before the climbing crane is positioned (as shown), or may be moved into position with the climbing crane in a single operation.

Figure 8:
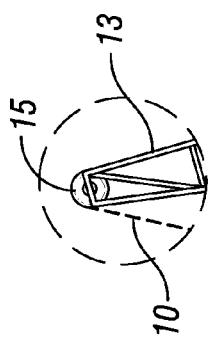
FIG. 8 is a detailed view of a tip of the balanced pivoting boom.
Figure 3:
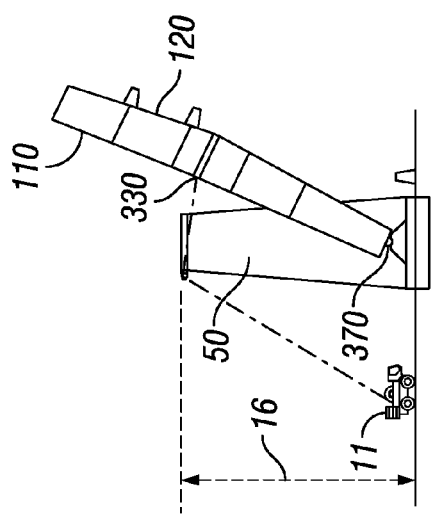
FIG. 3 illustrates the climbing crane positioned on the back edge of the rotating tower, and using its balanced boom for hoisting a further rotating tower segment into place atop the completed portion of the rotating tower.

FIG. 3 illustrates the operation of the climbing crane, with frame 8 shown positioned on the back edge of the rotating forward leaning tower 100. The operation of the components used in the attachment of the climbing crane is described below. Also illustrated is the balanced climbing crane boom 13. An upper tower section 9 is illustrated suspended from a lifting cable 10 that passes across the balanced pivoting boom 13 via sheaves 15 at each end of the balanced pivoting boom, and is controlled by a ground based winch vehicle 11. FIG. 3 also illustrates a powered motor system 19 and discussed in paragraph [0058] below. FIG. 8 illustrates a detail of an end of the balanced pivoting boom 13 including a rotatable sheave 15 and lifting cable 10. The tower segment is raised from the ground level 12 and hoisted into position on the rotating forward leaning tower. This process is continued sequentially until the tower reaches its full height. It will be appreciated that this disclosure teaches towers constructed up to and over 500 feet in height. (See vector arrow 14 illustrated in FIG. 6.) This is higher than the lifting capacity of most existing cranes.

This is achieved by combination of the modular tower construction, the positioning and movement of the climbing crane 7, comprised of frame 8 and balanced boom 13, coordinated with operation of a mobile ground winch 11.

Figure 4:
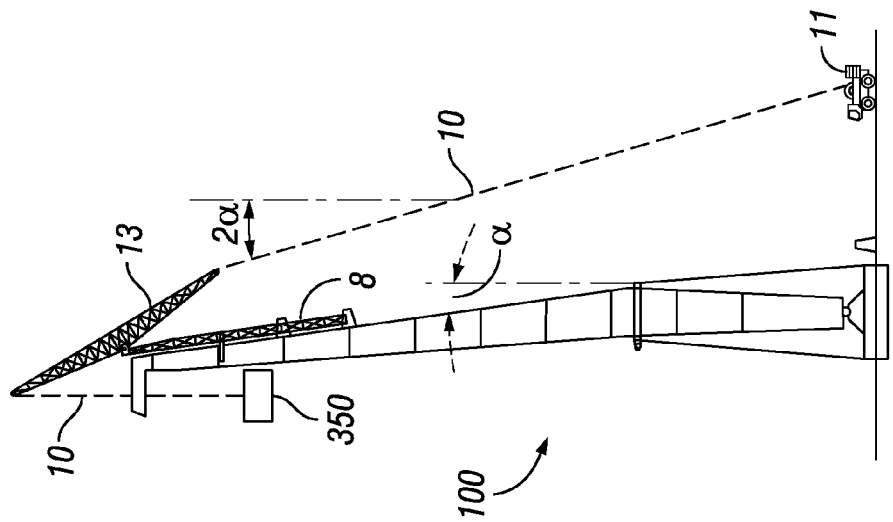
FIG. 4 illustrates using the climbing crane near the tower top, with the balanced boom hoisting a turbine nacelle.

FIG. 4 illustrates the tower 100 at its completed height. The climbing crane (illustrated as item 7 in FIG. 3) is elevated to its greatest height. The nacelle 350 is shown being hoisted into position at the top of the rotating forward leaning tower by lifting cable 10. The angle of the lifting cable from the winch vehicle 11 makes twice the angle 2a to the vertical of the tower back edge a. As will be explained below, the nacelle is hoisted into close proximity to the front edge of the tower.

Figure 5:
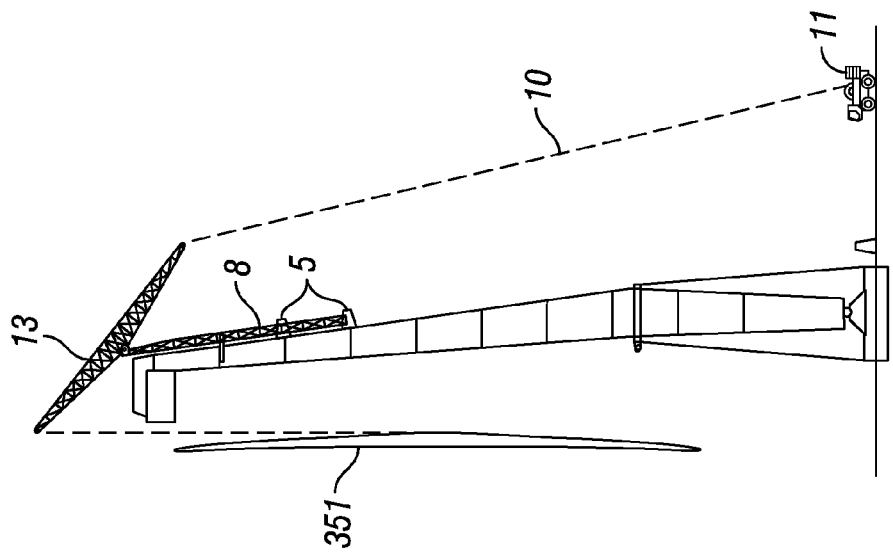
FIG. 5 illustrates the climbing crane hoisting the turbine rotor to the hub.

FIG. 5 illustrates the hoisting of the turbine rotor 351 to the top of the tower. Also illustrated are the attachment modules 5 for the climbing crane frame 8 and the crane boom 13, and the lifting cable 10 and winch vehicle 11.

Figure 6:
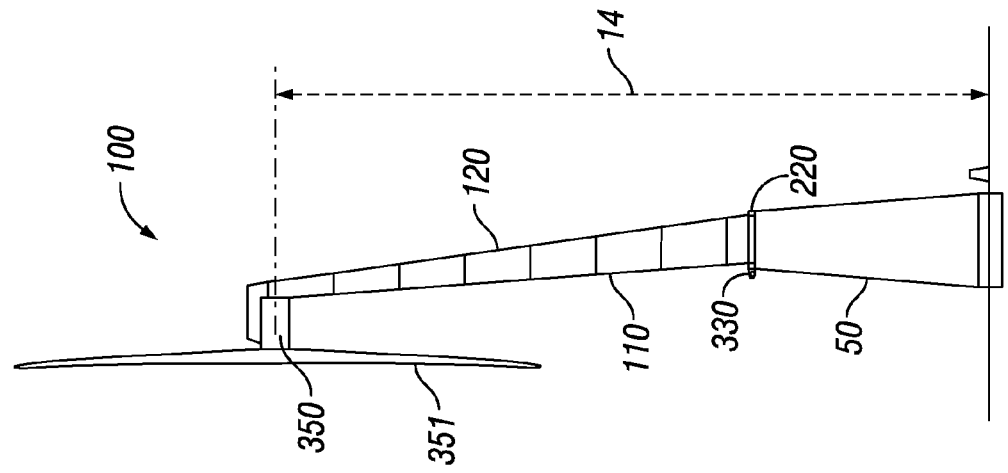
FIG. 6 illustrates the completed tower and turbine, with the climbing crane removed.

FIG. 6 illustrates the completed tower and turbine. The tower 100 comprises the fixed lower tower 50, the lower bearing (not shown), mid tower collar 330 and upper bearing 220, the back edge 120, front edge 110, rotor 351, and nacelle 350. The tower height is represented by vector arrow 14. It will be appreciated that the lower portion of the rotating tower, i.e., below the upper bearing, rotates within the visible external fixed lower tower.

With reference to FIG. 1, the natural provision of a strong location part way up the tower merges well with erection using a tilt-up step. Because the tilt-up loads are applied where the front to back edge separation is greatest, the amount of material needed in the structural edges is much reduced, and feasible tilt-up size compared with conventional towers is substantially increased. This, combined with the climbing crane, improves the economics and feasibility of increased tower height. The amount of tower to tilt up vs build incrementally can be dictated by the economics of site and transportation logistics.

The drag of a circular tower is more than five times the drag created by an aerodynamically streamlined shape of similar crosswind dimensions. Circular cylinders create substantial drag, due to large-scale disruption of fluid flow. The drag coefficient (Cd) for a large diameter circular tower in extreme wind conditions is approximately 0.7, and can be well in excess of 1.0 over a large range of operating Reynolds numbers. Research conducted on elliptical shapes similar in form to the wing shaped tower show that a Cd of 0.14 is attainable for such tower sections, thereby reducing direct aerodynamic tower drag loads during extreme winds by about a factor of 5. Further drag reduction via a more airfoil shape is possible, but may be limited by cost.

The rotating tower can be constructed to allow the front edge to lean into the windward direction, as shown in FIG. 6. This increases the distance between the tower leading edge and the plane of rotation of the turbine blades, and minimizes potential for damage to the turbine blades by striking the tower, thereby allowing for more blade flex during design.

Forward lean also decreases the moment distribution from rotor thrust that must be carried by the tower and its foundation, the mass upwind of the tower rotation axis providing a moment which counteracts some of the thrust induced bending moment normally carried by tower fore-aft mechanical strength.

The tower design subject of this disclosure incorporates a rotating tower with the capability to hoist the nacelle and rotor to hub heights that are well beyond current limits. A recent NREL report (Cotrell, J., Stehly. T., Johnson, J., Roberts, J. O., Parker, Z., Scott. G., and Heimiller, D., "Analysis of Transportation and Logistics Challenges Affecting the Deployment of Larger Wind Turbines: Summary of Results," NREL/TP-5000-61063, January 2014 noted that nacelle hoisting is one of the most significant challenges for tower heights over 140 m. The nacelle weight for the 3.0 MW baseline turbine was 67 metric tonnes and it must be lifted to the full hub height. This requires a 1,250 to 1,600 tonnes crawler crane to assemble the wind turbine generator (WTG).

There are three notable aspects to the tilt-up, incremental build, and hoist approach as illustrated schematically in FIGS. 1 through 5.
1. A fixed structural base tower that supports the wing tower tilting and build.
2. A wing-shaped, tilt-up tower using a hybrid of high strength front and back edges with lighter weight side panels. The amount of tilt up versus incremental build will be determined by site conditions, economics, and the height goal.
3. A forward lean on the wing tower similar to tall crane booms that aids the nacelle and rotor lift into position after wing tower build is completed.

Feasibility

The fixed lower tower can be constructed using segmented steel or concrete construction as is seen in existing hybrid tower designs. An extension beyond current practice is leaving out one or more segments to tilt up the lower part of the rotating tower. Note that the size of the tilt up portion is to be chosen for best overall tower and erection costs—it could be anything from zero to full height as best benefits cost at given sites. It is possible to build the lower part of the rotating tower incrementally within the fixed portion. Using an incremental build for the lower rotating tower assures that the departure point for the upper tower build via the climbing crane can be achieved. In some rough terrain sites, this may be the best option, possibly the only option, available if or as needed.

Exploiting the forward lean of the tower allows a relatively simpler and smaller size climber crane to move up the tower in multiple steps, installing successive upper tower segments as it proceeds. A characteristic of the tapering design of the upper tower is that the front edge/back edge pieces, illustrated in FIG. 7, that carry the major loads can be similar shape and thickness, which aids both mating the climber to the tower at different heights, and keeping its lift weight requirement more nearly constant with height than conventional tower designs. It will be appreciated that the back edge can be fabricated with elements (not shown) that allow attachment and movement of the climbing crane. These elements can be permanent fixtures of the back edge. It is anticipated that the length of the segments can be chosen to facilitate the climber-crane design as well as shipping logistics. In effect, the tower itself becomes the boom of an ever taller crane as work progresses. There may not be any other way to achieve breakthrough heights, since some form of crane is needed to reach above the tower top to lift the nacelle and rotor. Costs for exceptionally tall cranes rise very quickly, and they are not available to service all locations. The costs that go into building this tower remain with the turbine; there are no large crane mobilization or teardown costs.

The climbing crane is illustrated in FIGS. 3-5. It comprises a climbing crane frame, attachment modules, and balanced pivoting boom. The frame is a beam structure that is positioned and moves parallel to the slope of the tower back edge. The climbing crane includes attachment modules for attachment of the frame to the tower back edge. The frame has at its tip a pivoting boom that provides forward reach for lifting the loads.

Back edge elements engaged by the climbing crane attachment modules could be a captive rail(s) as used on roller coasters, holes into which mechanical cogs are inserted, complementary geared wheels and rails, or bands that reach around the tower and secure the crane from falling away, with wheels to roll along the tower edge, or even magnetic retention given a steel back edge.

The height adjustment of the climbing crane can be achieved in many ways, for instance by one or more hydraulic lifts within the attachment modules. The hydraulic lift(s) can contain components such as over center grip pads that interface with complementary fitting components such as a rail(s) on the back edge. The hydraulic lifts would propel the climbing crane to the next higher level on the back edge, while multiple redundant over-center grip pads or equivalent could provide safe retention by requiring active release to safeguard against accidental drop, similar to personal safety harness climbing equipment.

In another embodiment, the climbing crane uses cogs as on cogged railways, with the attachment modules employing cog wheels interfacing with a cog pattern affixed to the tower back edge. In another embodiment the climbing crane attachment comprises a geared or toothed wheel that interfaces with geared or toothed rail(s) permanently attached to the tower back edge.

It will be appreciated that additional fitting components of the back edge may be located at engineered strong points. For example, there may be fitting components at the junctures of tower segments. It will be appreciated that there is substantial material reinforcement at these junctures due to overlap between the tower segments, so they are favored locations for reacting the elevated loads that occur during component lifting.

The cog and geared rail systems are examples of permanent back edge elements. The components may include one or more guide rails. Similar rails could provide a griping surface for one or more additional fail safe components on the climbing crane frame or attachment modules.

The above described cog wheel, geared or toothed wheel, and hydraulic lift are examples of climbing crane attachment module elevation devices. Other examples are clamping pads similar to brake system calipers that grip and release in sequentially higher (or lower) positions, or a winch and cable or chain that lifts or lowers the climbing crane to a new height. Many other mechanisms that can achieve the same functions are known, and are claimed herein as ways to adjust the climbing crane height while securing it to the rotating tower back edge.

Another component of the attachment modules are contact pads that are shaped to complement the surface of the tower back edge. The pads help transfer the crane load into the tower, and also serve to limit deformations in the tower edge shape induced by the loads. They may be adjustable in shape if needed to follow changes in tower back edge shape.

The climbing crane also includes a balanced pivoting boom comprising a beam structure at the upper tip end of the climbing crane frame that pivots to control the forward reach of the lift hook. This beam may be strengthened or built lighter using a kingpost and cable arrangement above it to increase the geometry carrying the beam bending loads.

The climbing crane used in conjunction with the rotating forward leaning tower is a quite novel and useful development. There is, however, an important structural limitation. It is important that the climbing crane not impose loads on the partially complete tower during erection, and on the completed tower during turbine nacelle and rotor lift, that add significant cost and weight penalties to the tower as it would be designed in the absence of the climber crane. In its normal function (absent the role of the climbing crane) the tower carries the wind turbine rotor induced loads to the ground.

The rotating tower front and back edges are therefore constructed to carry the large structural loads in the vertical direction. The vertical component of the climbing crane loads is small relative to tower working and extreme wind loads, and will not require further strengthening.

The same is not true for bending moment induced forces applied perpendicularly into the tower back edge by the climbing crane. In normal operation of the rotating forward leaning tower (even in extreme winds), the local loads on the tower edges are small compared to those that can be created from the overhanging moment of the lifting operations. Therefore net loads must be kept as close to the tower, and as well aligned with its length axis, as practical. As an example, if the load being lifted were 50 tons, and the forward reach were three times the climbing crane attachment module separation, then the climbing crane would have to apply 150 tons toward and away from the tower back edge at two primary attachment points. This is possibly beyond the capability of an unmodified rotating tower, and would impose additional cost and weight penalties.

Given the above, it is intended that the climbing crane not carry loads into its tower attachments as a conventional crane would do—it is acceptable to carry the vertical loads into the tower back edge, but the loads perpendicular to it must be largely eliminated. This requirement is met by the introduction of a balanced pivoting boom, which by its nature cannot communicate large moments into the climbing crane frame, nor the attachment modules which transfer its loads into the rotating tower back edge.

It should be noted that the pivoting boom does not have to be perfectly balanced to achieve its goals, as some level of perpendicular loads can be transferred toward or away from the tower back edge without modification. For engineering reasons, it may be advantageous to bias the boom one way or the other, for instance to distribute load into the attachment modules more evenly, or to preload the boom angle control in one direction, for instance if a cable and winch were used for this purpose. Balanced as used in this boom definition means near enough to equal moments to each side of the pivot that the tower need not be reinforced to handle the climber crane imposed loads. For a 1:1 cable system, a difference of 5%, 10%, or even 20% in boom arm lengths may thereby be consistent with the invention. Note that the art of multiple cable purchase would allow a half length boom on one side of the pivot if a 2:1 cable purchase were provided, and balance would still be achieved against a 1:1 cable purchase on the other side. There are too many multiple purchase possibilities to enumerate, all of which are claimed within the scope of the invention, provided they result in the properly constrained moment balance at the boom pivot as described above. For clarity, the ensuing discussion will be framed in terms of a cable system with near equal booms and the same purchase at each end.

In order to provide the pivoting beam balance described above, the primary load lifting winch can not be on the climbing crane—it must be an independent ground winch vehicle that applies the same downward force to the back arm of the boom as lifting the load does to the front arm. This vehicle must be large enough to supply the required lifting cable tension without itself being lifted off the ground, whereby it must weigh substantially more than the largest load to be lifted, so that needed forces to resist being slid toward the tower base can also be reliably provided. Given the size of large wind turbine components, a modified tracked vehicle similar in size to a Caterpillar D9 earthmover, possibly with additional mass added, could be needed for a 1:1 lift system. If used offshore, a suitably stabilized extension from the foundation or floating platform would provide the equivalent function of the ground base for the winch vehicle. In order to reduce the size of the ground winch vehicle, provide flexibility of operation, smaller cable loads, or other advantages, it is possible to use two ground vehicles, both of which may carry winches, or one of which may serve to dead end a 2:1 lifting cable, while the other carries the active winch. In this case, double sheaves would be used at each end of the pivoting boom, and a 2:1 sheave would be used at the primary lifting hook. Many other variations are possible within the usual art of multiple purchase cable systems, and all of these are included within the scope of the disclosed invention.

A consequence of the balanced nature of the pivoting beam is that it takes little force or energy to change its angle, even under load. In the idealized world of zero friction and perfect balance, it would take no force at all, and in that case, conservation of energy dictates that load height should be completely unaffected by changes in boom angle. Of course in the real world there is friction to overcome, balance isn't perfect, and cable vibrations, wind or other sources may impose transient loads. A powered motor system on the climbing crane is expected to provide the forces needed to overcome these loads. This could be done with a large gear on the balanced boom, and worm or pinion drives on the climbing crane frame, similar to how wind turbine yaw drives work. Alternatively, a winch and cable could be used, if the boom loads were biased so it always tries to pivot in one direction. This could also be done using additional independently controlled cables from the ground winch vehicle. Given the tower heights for which the climber crane is intended, this last is not seen as a preferred embodiment, but is claimed within the scope of the patent.

It remains the case that lift height would be largely independent of pivoting boom angle, and this could be an advantage for the final phase of the lifts where wherein the tower sections or turbine components are placed upon the tower structure. At that time, the pivoting boom will be at its nearest to vertical to provide minimum reach and maximum height, so it is in this condition where having the best decoupling of boom angle from load height is most valuable, allowing the crane operator to move the load toward or away from the tower precisely, without having to make multiple winch adjustments to compensate changes in height. Note also that the distance from the climbing crane support points to the load is very much shorter than the 500'+ reach to tower top for a ground crane, and because the climbing crane and tower move together rather than independently, the precision and speed of load placement will be aided by that feature of the invention as well.

To have complete decoupling of pivoting boom angle from load height, the angle to the vertical of the cable to the winch vehicle must be twice the angle to the vertical of the tower back edge. The balance of forces is most easily seen when the lift cable is not deflected at the aft boom sheave, as shown in FIG. 3 with the balanced boom near top of reach, in which case the bisector of the angle of the cable around the front arm sheave is parallel to the tower back edge, producing a force parallel to it as desired to help minimize loads from the climbing crane into the tower back edge, and no boom pivot moment.

As with the balance of the pivoting boom arm moments, it is understood that there may be engineering advantages to having a few degrees of bias to help distribute climbing crane loads into the tower optimally, or operationally to aid the precise placement of the lifted components. These variations from ideal bisection for engineering reasons are included within the scope of the disclosed invention. Also included is the option to move the winch vehicle between lifts to maintain the best angle when the pivoting boom is at top of reach, or even to adjust position by crawling the winch vehicle during the lift if there were special circumstance to warrant this additional adjustment.

Part of practical crane operation utilizing the rotating forward leaning tower is the provision of lateral lift line adjustment, that is, perpendicular to the direction toward or away from the tower, this latter provided by adjustments in the pivoting boom angle. Near ground level, the rotational yaw ability of the rotating tower combined with its forward lean can be used to provide a degree of lateral adjustment of the lift line for picking loads from the ground. This would not be used for large lateral movements, as that would impose additional loads on the climber crane, attachment modules, and tower back edge—a small ground crane would be used to place loads in the designated lift zone, and the limited lateral adjustment could be to aid attaching the load to the lift hook, or limiting adverse loads or motions in the initial lift free of ground contact.

At top of reach, yaw of the rotating tower is ineffective for lateral adjustment because both tower and crane move together, so instead climber crane lateral adjustment mechanisms would provide side to side movements of the climbing crane frame relative to the tower, and/or small angle rotation of the boom relative to the frame, to provide the limited lateral adjustment needed for load placement. Other mechanisms to achieve these same boom tip sideward adjustments are included within the scope of the present invention.

When the climbing crane is to adjust its vertical position on the back edge of the rotating tower, this could be done without lift load. The center of gravity of the climbing crane is not far removed from the back edge, so moments due to gravity force offset would be modest, and the gravity force vector would be nearly in alignment with the tower back edge. This imposes minimal requirements on the attachment modules and lifting mechanism during vertical crane position adjustment.

Lifting would be done once the climbing crane is in position at a chosen location. A preferred choice would be where the attachment modules are at the joints between tower sections, since the overlap creates a thicker, stiffer, and stronger zone there. At this location, secure retention would be engaged, such as pins inserted into holes in the tower or rails, or mechanical clamping to the rails that requires powered release. Many similar safety requirements exist for cables cars, ski lifts, as well as large crane erection, and would be applied to make the climbing crane movement and retention both safe and efficient. The use of such a system is claimed within the scope of this invention.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without

What I claim is:

1. A climbing crane system comprising:
   a) a climbing crane frame movably positioned substantially parallel to a tower back edge;
   b) controllably moveable attachment modules securing the climbing crane frame to the tower back edge, providing the ability to lift a climbing crane up a tower, hold the climbing crane in a stationary position on the tower, or lower the climbing crane down the tower, and said controllably moveable attachment modules also providing the ability to move the climbing crane frame laterally relative to the tower, and to attach and detach the climbing crane frame from the tower;
   c) a balanced pivoting boom at an upper tip end of said climbing crane frame, which provides and controls a forward reach of said climbing crane for lifting of tower segments, and of components to be lifted to a tower top once the tower is complete; and
   d) a ground based winch vehicle with a lifting cable connected to the climbing crane for the lifting of the tower segments, and of said components to be lifted to the tower top once the tower is complete.

2. The system of claim 1 wherein the controllably moveable attachment modules are configured to contact the tower back edge via load transferring and tower deformation limiting contact pads.

3. The system of claim 1 wherein the balanced pivoting boom comprises a load lifting cable, and at least one turning sheave at each end of the balanced pivoting boom, wherein the sheaves are adapted to pass across a boom cable from a load lifting cable system with at least one said lifting cable from at least one said ground based winch vehicle, to a lift zone on a front side of the tower with said at least one lifting cable from said at least one ground based winch vehicle, wherein the ground based winch vehicle is positioned to a back side of the tower and the lifting cable extends from the winch vehicle up to and across the balanced pivoting boom.

4. The system of claim 3, wherein the ground winch vehicle is positioned so the lifting cable from the winch vehicle approximately doubles an angle to vertical of the back side of the tower, with the balanced pivoting boom near top of reach, and wherein:
   a) the height of the components to be lifted remains approximately unchanged when the balanced pivoting boom to the climbing crane frame angle is adjusted;
   b) the ground winch vehicle maintains double the cable angle to the vertical of the back side of the tower at different heights of tower erection.

5. The system of claim 1, wherein the angle of the balanced pivoting boom to the climbing crane frame is configured to be controlled by a power motor system on the climbing crane wherein, said power motor system need not react to pivot rotational forces arising from a change of a lifted component height with boom angle.

* * * * *